United States Patent Office

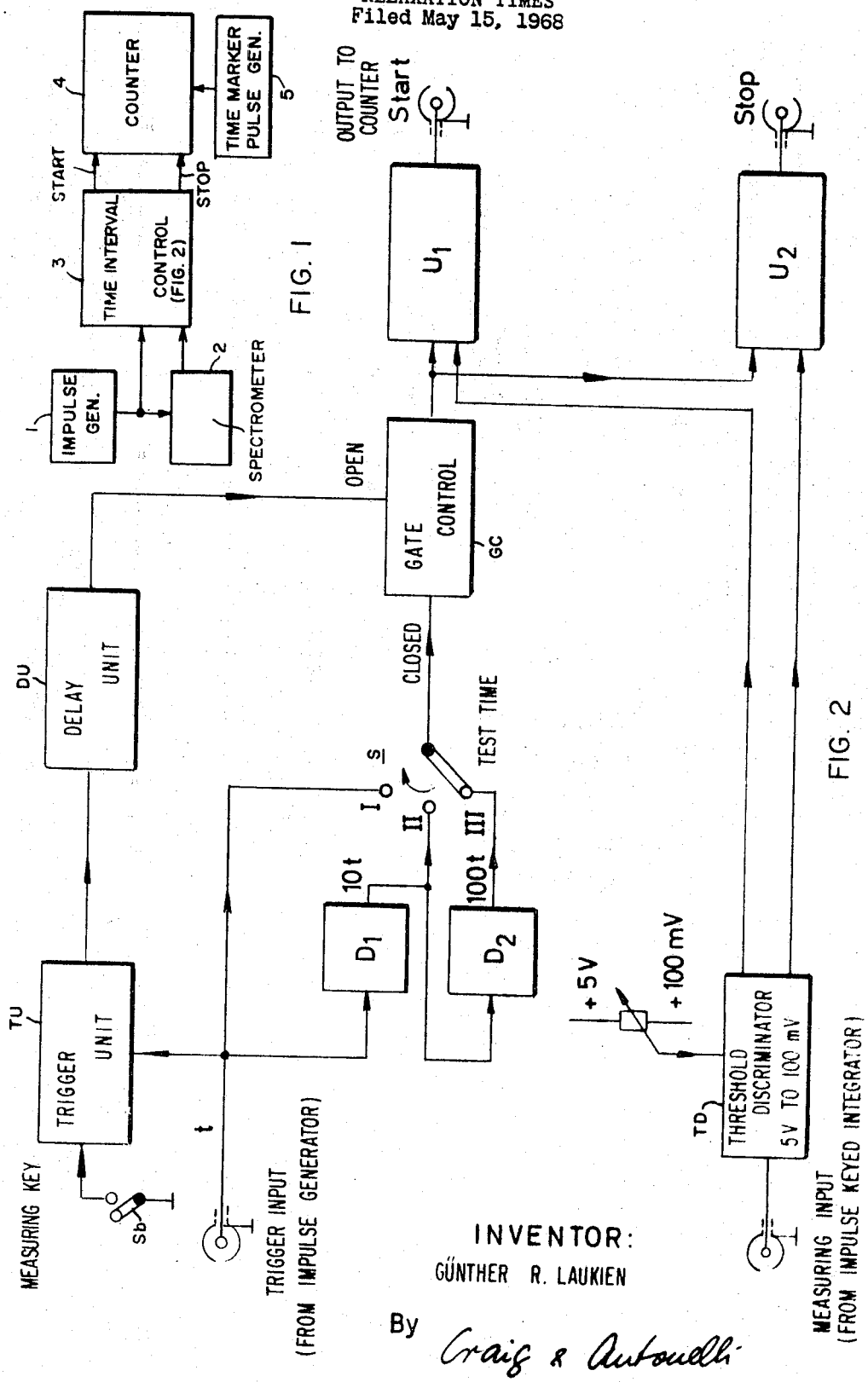

3,564,399
Patented Feb. 16, 1971

---

3,564,399
PROCESS AND DEVICE FOR THE DIRECT MEASUREMENT OF CHARACTERISTIC TIME CONSTANTS OF RISING OR FALLING CURVES AS A FUNCTION OF TIME, WITH PARTICULAR REFERENCE TO THE DIRECT MEASUREMENT OF NUCLEAR MAGNETIC RELAXATION TIMES
Günther Rudi Laukien, Am Silberstreifen,
Forchheim, Karlsruhe, Germany
Filed May 15, 1968, Ser. No. 729,200
Claims priority, application Germany, Nov. 2, 1967,
B 95,209
Int. Cl. G01n 27/78
U.S. Cl. 324—.5           12 Claims

ABSTRACT OF THE DISCLOSURE

The time constant of a portion rising or falling of an electrical signal waveform (especially representative of relaxation phenomena in nuclear sprectrography) is determined. To ascertain the time constant, the count of a number of time marker pulses is begun at a first predetermined level of the waveform and ended at a second predetermined level. The number of time marker pulses counted is indicative of the time constant of that portion of the waveform whose signal level varied between and crossed the two predetermined levels.

---

The invention concerns a process for measuring the characteristic time constants of rising or falling curves as a function of time, with particular reference to voltage or current waveforms being proportional to the values which are actually to be measured, especially for the measurement of nuclear magnetic relaxation times from falling or rising signal voltage waveforms excited by pulse techniques.

In pulsed spectroscopy one measures the characteristics of samples of interest by investigating with the help of high frequency pulses the behaviour of atomic nuclei having $I \neq 0$ which are included in the samples. The high frequency oscillations induce a precessional motion to the nuclei by means of their magnetic moments. These precessional motions also continue after the pulses. Using pulse programs in the intervals between pulses one can observe the nuclear resonance signal as free precession undisturbed by the stimulation process. This is done by observing the AC-voltage induced in measuring coils by the precessing magnetization. One can determine, inter alia, relaxation times and diffusion coefficients from the waveform of such signals or from the envelope of a series of such signals (cf. the article by H. Strehlow in "Berichte der Bunsen-Gesellschaft," vol. 67, p. 255f. 1963).

This well known process is however time consuming because the information in the signal waveforms must be evaluated by special techniques. Also in some cases in the curves so obtained the interval between the signal and the noise level is not great enough. The invention avoids these disadvantages. The task of the invention is akin to that of a relaxation time counter that works out the measurement values by itself as well as permitting an increase in the signal to noise level.

The task is accomplished by comparing the measurement value mostly in the form of a signal voltage, with two or more adjustable reference values in a threshold discriminator. As the signal value equals one of the preset reference values in the discriminator a trigger signal is released which opens or shuts a path leading to a counter so that during the open period time marker pulses with a known interval e.g. 1 microsecond, are counted and at the end of the measurement the duration of time, e.g., elapsed between the moment when the signal reached the first preset reference value and the moment when the signal reached the second preset reference value, is displayed directly on the counter.

In a further arrangement of the invention the preset threshold values are so chosen that the displayed time may be directly interpreted as relaxation time or other characteristic time constant, i.e. the second threshold value remains in a fixed relationship to the first threshold value, e.g., in the relationship $1/e$, when e.g. the characteristic time constant of a pure exponential decay has to be determined. The same decay time can automatically be repeatedly measured so that by taking the mean value the accuracy of the measurement may be improved.

The invention will be described with reference to the accompanying drawings which show by way of example block diagrams of form of the invention.

FIG. 1 is an overall diagram of the system incorporating the invention.

FIG. 2 depicts in block diagram form the stop-start control circuitry in block 3 of FIG. 1.

Attention may be directed to FIGS. 1 and 2 for the following operation of the invention.

The measuring process is started by pressing a button shown as switch Sb on the unit TU. A single control pulse is fed to the trigger unit in synchronism with only the next trigger pulse coming from the pulse generator 1. This pulse received in this unit is delayed by a fixed amount of time by a monostable flip-flop DU, for example 10 microseconds. Since the measuring process requires a certain amount of time for excitation to occur, the delay unit insures that the time constant measuring process cannot take place prior to the expiration of a specific build-up time.

The following trigger pulse from the pulse generator can be used to end the measuring process (single measurement). If one wishes to increase the accuracy of the measurement one can end the measurement process with every 10th or alternatively every 100th trigger pulse, derived by two decades D1 and D2 and chosen using switch S (duration of measurement).

This duration of measurement can be set by adjustment of the switch S (I, II, III).

The pulse integrator gives the Spin-Echo curve to be evaluated. The respective input is connected to the threshold discriminator TD from spectrometer 2, for example. This unit consists of two difference amplifiers with additional transistor stages which determine the upper and lower threshold values with the passage of the exponential function. It should be noted here that the echo curve can be thought of as an $e$ function or a number of combined $e$ functions. The expression "$e$-function" is to designate an exponential function having the base $e$, namely the base of the natural logarithm. The upper threshold value is set, let us say, between $+5$ and $+100$ mv. depending on the size of the signal, using the externally adjustable precision potentiometer. This gives the upper threshold value $U_0$. Simultaneously the lower threshold value is automatically set at $U_0/e$.

These values are variable, using an additional switch not shown, in such a fashion that one always measures relaxation time $T_2/10$ with a single passage or $T_2$ with ten passages. The analysis of the relaxation time contained in the signal decay is thus simplified.

The pulse leaving the gate control GC is led to both "and" gates $U_1$, $U_2$. The pulses from the discriminator, namely the start-pulse and the stop-pulse, arrive simultaneously at the upper "and" gate (start-pulse) and at the lower "and" gate (stop-pulse). $U_1$ starts the counter 4, $U_2$ stops it. During the counter interval, counter 4 counts the number of time marker pulses received from time marker pulse generator 5. The spacing of the two open close pulses is so apportioned that in position I of switch S only a single signal passage will be measured, in switch position II ten and in switch position III one hundred signal passages are added together on a time basis.

A printer can be used instead of a counter.

The essential advantage of the equipment according to the invention is that a raising of sensitivity and an increase of accuracy can be achieved by multi-automatic and adjustable repetition of the measurement process. On the other hand there is the possibility of investigating a composite exponential curve according to its various time constants.

Having thus fully described my invention, what I claim as new, and desire to secure by Letters Patent, is:

1. An apparatus for measuring the characteristic time constants of at least one electrical waveform made up of a number of transient portions representative of nuclear magnetic relaxation times, comprising:

first means for generating said electrical waveform, second means for producing signals for initiating the generation of said electrical waveform, third means responsive to said first means for determining the time taken by the transient portions of said electrical waveform to traverse the interval between and cross first and second adjustable predetermined threshold levels, and fourth means responsive to said second means for counting the signals produced by said second means to terminate the operation of said third means after a predetermined number of said waveforms are produced to effectively control the time interval over which the time constants are measured.

2. An apparatus according to claim 1, wherein said third means includes a time marker pulse counter, the number of pulses counted by said counter during the time that a portion of said electrical waveform traverses the interval between and crosses said first and second adjustable predetermined threshold levels, being indicative of the time constants of said portions of the waveform.

3. An apparatus according to claim 2, wherein said third means further includes a threshold discriminator, responsive to said electrical waveform, for delivering stop and start signals to said time marker pulse counter, when the magnitude of said electrical waveform reaches said first and second predetermined threshold levels respectively.

4. An apparatus according to claim 1, wherein said second means includes means for generating a series of pulses, each one of said series of pulses initiating the generation of said electrical waveform.

5. An apparatus according to claim 4, wherein said fourth means includes a trigger unit responsive to a predetermined one of said pulses in said series, for generating a trigger signal for triggering said fourth means for the measuring of at least one time constant.

6. An apparatus according to claim 5, wherein said fourth means further includes a delay circuit, responsive to said trigger signal, for delaying said trigger signal a sufficient length of time to permit said electrical waveform to be generated.

7. An apparatus according to claim 1, wherein said fourth means includes a control circuit for enabling said third means at the beginning of the time interval and for disabling said third means at the end of said time interval.

8. An apparatus according to claim 1, wherein said fourth means includes means responsive to said second means for pre-selecting a number of signals produced by said second means, to be counted.

9. An apparatus according to claim 6, wherein said fourth means includes a control circuit for enabling said third means at the beginning of the time interval and for disabling said third means at the end of said time interval, said gate control circuit enabling said third means upon receipt of said delayed trigger signal and disabling said third means upon a pre-selected one of said series of pulses generated by said second means.

10. An apparatus according to claim 3, wherein said fourth means further includes first and second respective and-gates whose inputs are connected to said threshold discriminator and whose outputs are connected to said time marker pulse counter for receiving said stop and start signals to thereby control the counting operation of said time marker pulse counter.

11. An apparatus according to claim 9, wherein said third means includes a time marker pulse counter, the number of pulses counted during the time that a transient portion of the electrical waveform traverses the interval between and crosses said first and second adjustable predetermined threshold levels, being indicative of the time constant of said portion of the waveform.

12. An apparatus according to claim 8, wherein said pre-selecting means includes a switchable pulse divider circuit for dividing the number of signals produced by said second means by a predetermined number.

References Cited

UNITED STATES PATENTS

| | | | |
|---|---|---|---|
| 3,042,859 | 7/1962 | Shillington | 324—68 |
| 3,359,491 | 12/1967 | McCutcheon | 324—68 |

MICHAEL J. LYNCH, Primary Examiner

U.S. Cl. X.R.

324—186